United States Patent [19]

Syohji

[11] 3,867,722

[45] Feb. 18, 1975

[54] CASSETTE EJECT MECHANISM

[75] Inventor: Keisuke Syohji, Nagoya, Japan

[73] Assignee: Shin-Shirasuna Electric Corporation, Nogoya-shi, Japan

[22] Filed: June 12, 1973

[21] Appl. No.: 369,230

[30] Foreign Application Priority Data

Aug. 29, 1972 Japan .............................. 47-101678

[52] U.S. Cl. .................................... 360/96, 242/198

[51] Int. Cl. .......................................... G11b 15/00

[58] Field of Search ................. 274/4 E; 360/96, 93; 242/198, 199

[56] References Cited

UNITED STATES PATENTS

| | | | |
|---|---|---|---|
| 3,432,169 | 3/1969 | Schroder | 274/4 E |
| 3,458,158 | 7/1969 | Ohira | 274/4 E |
| 3,476,392 | 11/1969 | Culbertson et al. | 274/4 E |
| 3,759,529 | 9/1973 | Yoshii | 274/4 E |

*Primary Examiner*—James W. Moffitt
*Assistant Examiner*—Stewart Levy
*Attorney, Agent, or Firm*—Depaoli & O'Brien

[57] ABSTRACT

A magnetic recording-reproducing device having a cassette eject mechanism and which comprises, in addition to a "play-back" key, a "stop" key and other operating keys, an "eject" key for ejecting a magnetic tape cassette mounted on reel spindles, whereby for example, when the "eject" key is depressed with the "play-back" key maintained depressed to keep magnetic head means in engagement with a magnetic tape, the "play-back" key is released from its depressed position while the magnetic head means is disengaged from the magnetic tape, and re-depression of the "eject" key causes the cassette to be automatically ejected. When neither of the keys is being depressed, the cassette is ejected upon first depression of the "eject" key.

5 Claims, 4 Drawing Figures

PATENTED FEB 18 1975 3.867,722

CASSETTE EJECT MECHANISM

This invention relates to a magnetic recording-reproducing device, and more particularly to a cassette tape recorder having a cassette eject mechanism.

The cassette eject mechanism heretofore generally used has been constructed entirely independently of the mechanism for transporting or stopping a magnetic tape upon depression of a play-back key, a record key or a stop key, for example. Such eject mechanism has been disadvantageous in that when the eject key is inadvertently depressed by the operator during the reproduction or the recording, an unreasonable force may be exerted on the cassette to forcibly discharge it with the tape still in motion, thus resulting in failures of the tape recorder.

In an attempt to avoid such problem, a construction has been proposed which prevents the eject key from being depressed during movement of the tape. In order to discharge the cassette, if the tape is moving with the play-back key depressed, such construction has involved the cumbersome procedures of first depressing the stop key to release the play-back key from depressed position and thereby stop the tape from moving, and then depressing the eject key which is discrete from the stop key.

It is therefore an object of the present invention to provide a magnetic recording-reproducing device having an eject mechanism adapted to prevent any unreasonable force from being exerted on the cassette and associated parts even if the eject key is depressed during movement of the magnetic tape.

It is another object of the present invention to provide a magnetic recording-reproducing device having a cassette eject mechanism adapted to stop the movement of the magnetic tape and discharge the cassette upon depression of the eject key alone.

According to an aspect of the present invention, there is provided a magnetic recording-reproducing device which comprises a pair of reel spindles for removably mounting thereon a magnetic tape cassette, drive means for rotating said reel spindle, at least two, first and second, depressible operating keys, magnetic head means adapted to engage a magnetic tape in said cassette upon depression of said first operating key, and means for locking said first operating key in depressed position, said device having a cassette eject mechanism whereby when said first operating key is depressed and locked in depressed position by said lock means, the lock of said first operating key by said lock means may be released upon depression of said second operating key, thereby disengaging the magnetic head means from the magnetic tape and simultaneously therewith stopping the tape from moving, and thereafter re-depression of the second operating key causes the magnetic tape cassette to be discharged.

The cassette eject mechanism according to the present invention may include resiliently pivotable receptacle means adapted to assume a first position for removably receiving said cassette with the latter being not mounted on said reel spindles and a second position for mounting said cassette on said reel spindles, second lock means for locking said receptacle means in said second position, and means for actuating said second lock means. The actuating means is operative to release the lock of said receptacle means by said second lock means upon depression of said second operating key only when said first operating key is in undepressed position.

Further, the second lock means is resiliently pivotable and may have one end engageable with said receptacle to releasably lock the same in said second position, and another end engageable by said actuating means to be pivotably moved thereby out of engagement with said receptacle, whereby said receptacle means may be unlocked to resiliently assume said first position.

Furthermore, the actuating means may be associated with said first operating key so as to be rotated in response to depression of said first operating key, and said actuating means may be associated with said second operating key in such a manner that only when being not rotated by depression of said first operating key, said actuating means is brought into engagement with said second lock means upon depression of said second operating key to pivotally move said second lock means. The first and second operating keys may be depressibly mounted on a common shaft.

Other objects, features and advantages of the present invention will become apparent from the following detailed description taken in conjunction with the accompanying drawings.

Figure 1A:
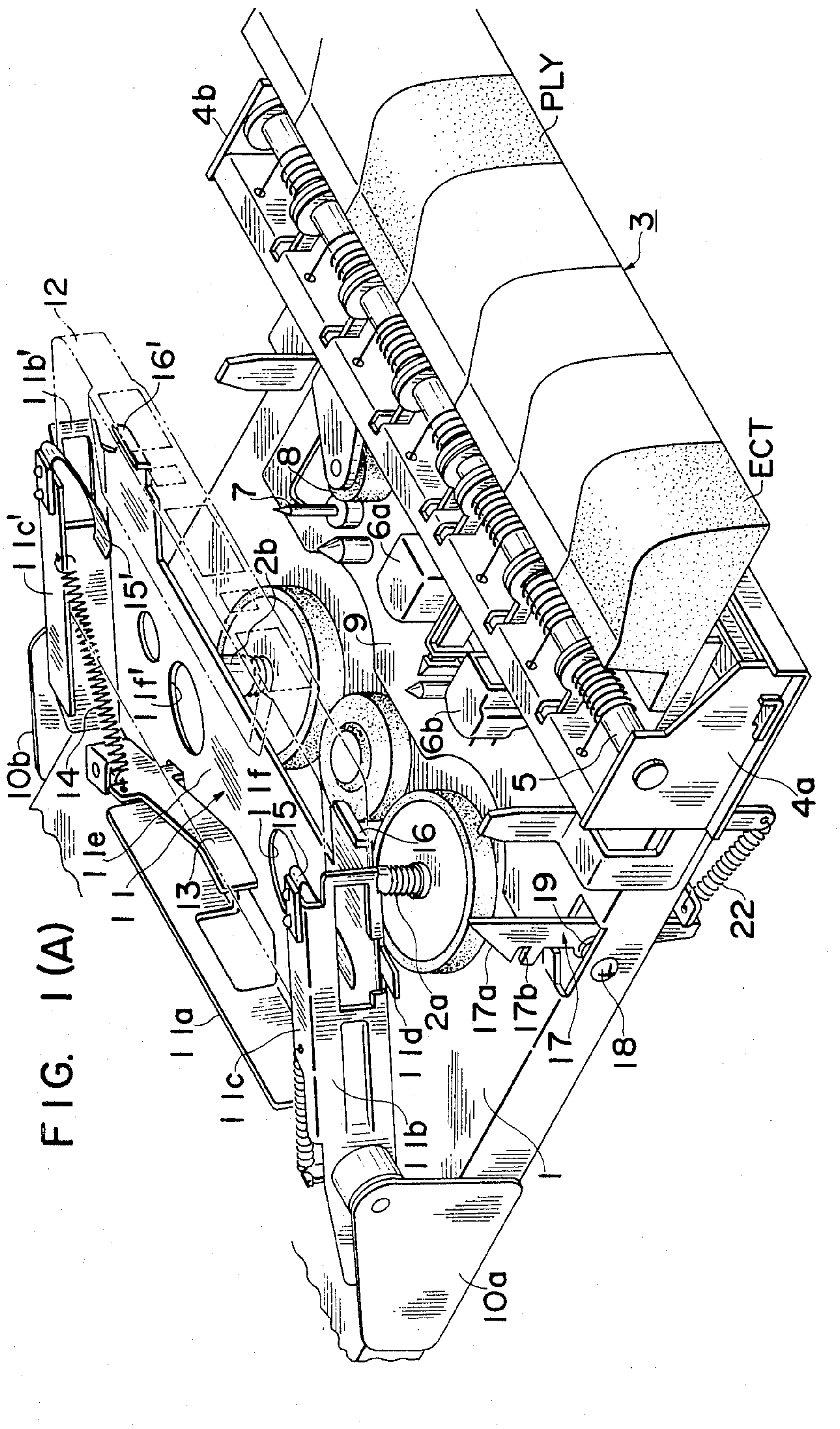
FIG. 1A is a perspective view of a cassette tape recorder provided with the cassette eject mechanism of the present invention and showing it with a tape cassette partly inserted in a receptacle member in the first position thereof.
Figure 1:
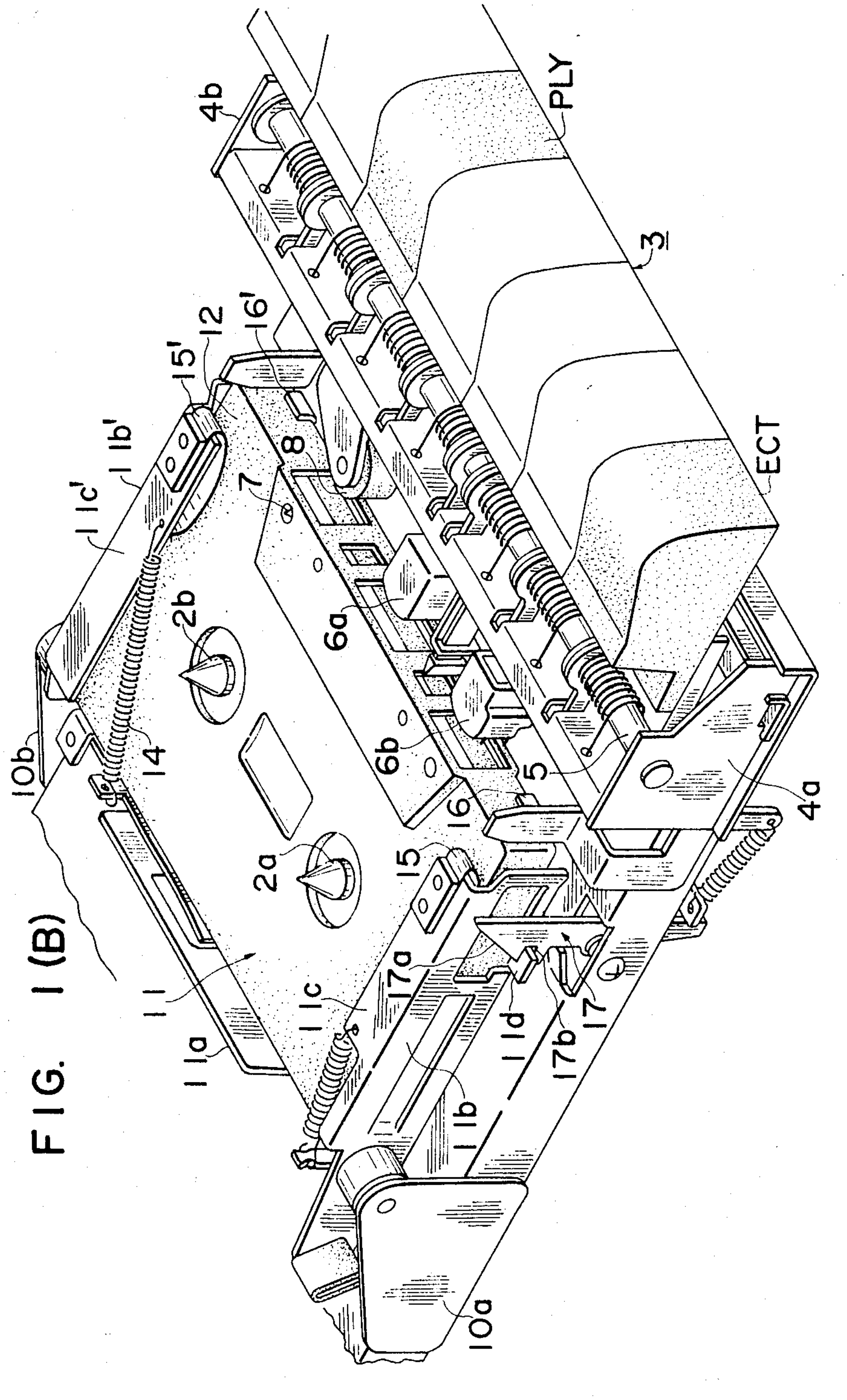
FIG. 1B is a view similar to FIG. 1A but showing the tape recorder with the tape cassette fully inserted in the receptacle member in the second position thereof.

Referring first to FIG. 1A, there is shown a cassette tape recorder provided with the cassette ejector according to an embodiment of the present invention. Extending upwardly through a chassis 1 are a pair of reel spindles 2*a* and 2*b*, and a row of keys 3 including a play-back key PLY and an eject key ECT are disposed at one side of the chassis 1 and depressibly mounted on a common shaft 5 which in turn is mounted between a pair of upright brackets 4*a* and 4*b*. Disposed between the reel spindles 2*a*, 2*b* and the row of keys 3 is a record-reproduce head 6*a*, an erase head 6*b*, a capstan 7 and a pinch roller 8. Upon depression of the key PLY, the heads 6*a* and 6*b* and a subchassis 9 having them mounted thereon may be together slidden toward the reel spindles 2*a*, 2*b* and the pinch roller 8 may be urged into engagement with the capstan 7.

The chassis 1 has another pair of upright brackets 109 and 10*b* attached thereto, and a receptacle member 11 for accommodating therein a magnetic tape cassette is pivotally mounted between the brackets 10*a* and 10*b* and normally biased obliquely upwardly by a spring (not shown) with respect to the upper surface of the chassis 1, in the manner as shown. The receptacle member 11 has a back wall 11*a* and a pair of side walls 11*b*, 11*b'* whose top portions are inwardly bent as indicated at 11*c* and 11*c'*. The front side of the receptacle is open to admit a tape cassette therein as indicated by phantom lines 12 in FIG. 1A. Adjacent and opposed to the back wall 11*a* is a push-out member 13, which is pivotally mounted. The push-out member 13 is biased away from the back wall 11*a* by a coil spring 14 extending between and secured to the member 13 and the top portion 11*c'* of the side wall 11*b'*. Plate springs 15 and 15' for controlling the vertical position of the cassette 12 are attached to the inner surface of the side walls 11*b* and 11*c'* adjacent their top portions 11*c* and 11*c'*. A pair of retaining pawls 16 and 16' is provided on the front edge of the receptacle member 11 and adapted to engage the front wall of the cassette 12. A laterally outwardly extending projection 11*d* is formed on the side wall 11*b*.

When the cassette 12, partly inserted in the receptacle member 11 as shown in FIG. 1A, is further inserted into the receptacle against the resilient forces of the push-out member 13 and plate springs 15, 15', the front wall of the cassette is retained by the retaining pawls 16 and 16' so that the cassette is snugly accommodated in the receptacle member 11. When the receptacle member 11 is then forced to pivot downwardly, the projection 11*d* thereof bears against the sloped upper end portion 17*a* of a lock member 17 to be described, whereafter it fits into the locking cutaway 17*b* of the lock member 17 to hold the receptacle member 11 in the manner as shown in FIG. 1B. In this position, it will be seen that the cassette 12 is mounted on the reel spindles 2*a*, 2*b* with these spindles now passing through a pair of apertures 11*f*, 11*f'* formed through the bottom 11*e* of the receptacle member 11.

The lock member 17 is pivotally mounted on the chassis 1 at one side thereof by means of a shaft 18 and biased into a vertical position with respect to the major surface of the chassis by a spring 19 mounted on the shaft 18. Thus, when the receptacle member 11 is downwardly pivoted to cause the projection 11*d* thereof to bear against the sloped upper end portion 17*a* of the lock member 17 and the receptacle member 11 is further downwardly pivoted, as described previously, then the lock member 17 is rotated about the shaft 17 against the force of the spring 19 as indicated by phantom lines in FIG. 2A, until the projection 11*d* comes to confront the cut-away 17*b*, whereupon the lock member 17 is momentarily positioned vertically by the spring 19 with a result that the projection 11*d* fits into the cut-away 17*b*, thus locking the receptacle member 11 in the manner as shown in FIG. 1B.

Figure 2A:
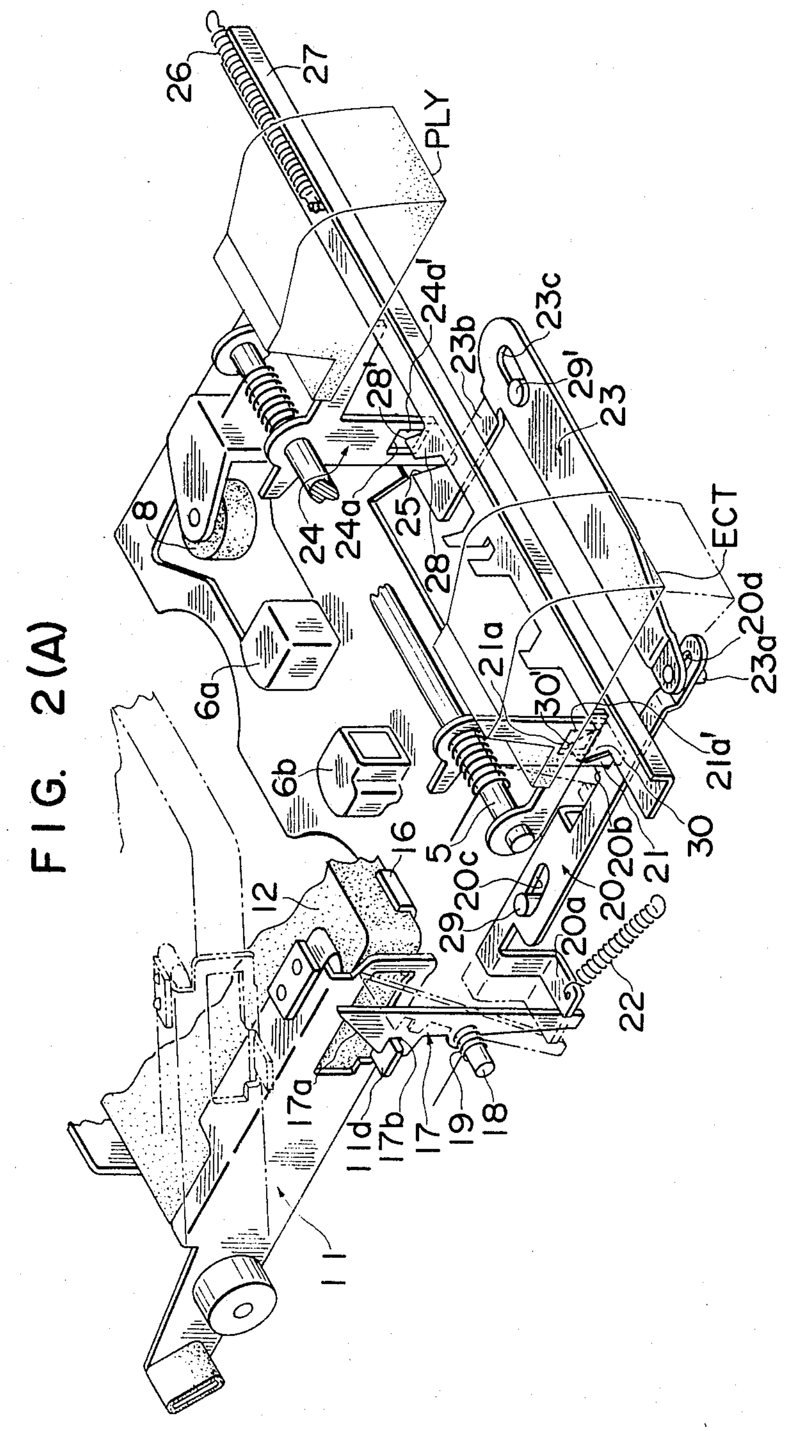
FIG. 2A is a partly cut-away perspective view of the tape recorder with the receptacle in the first position and showing the construction of the cassette eject mechanism of the present invention.
Figure 2B:
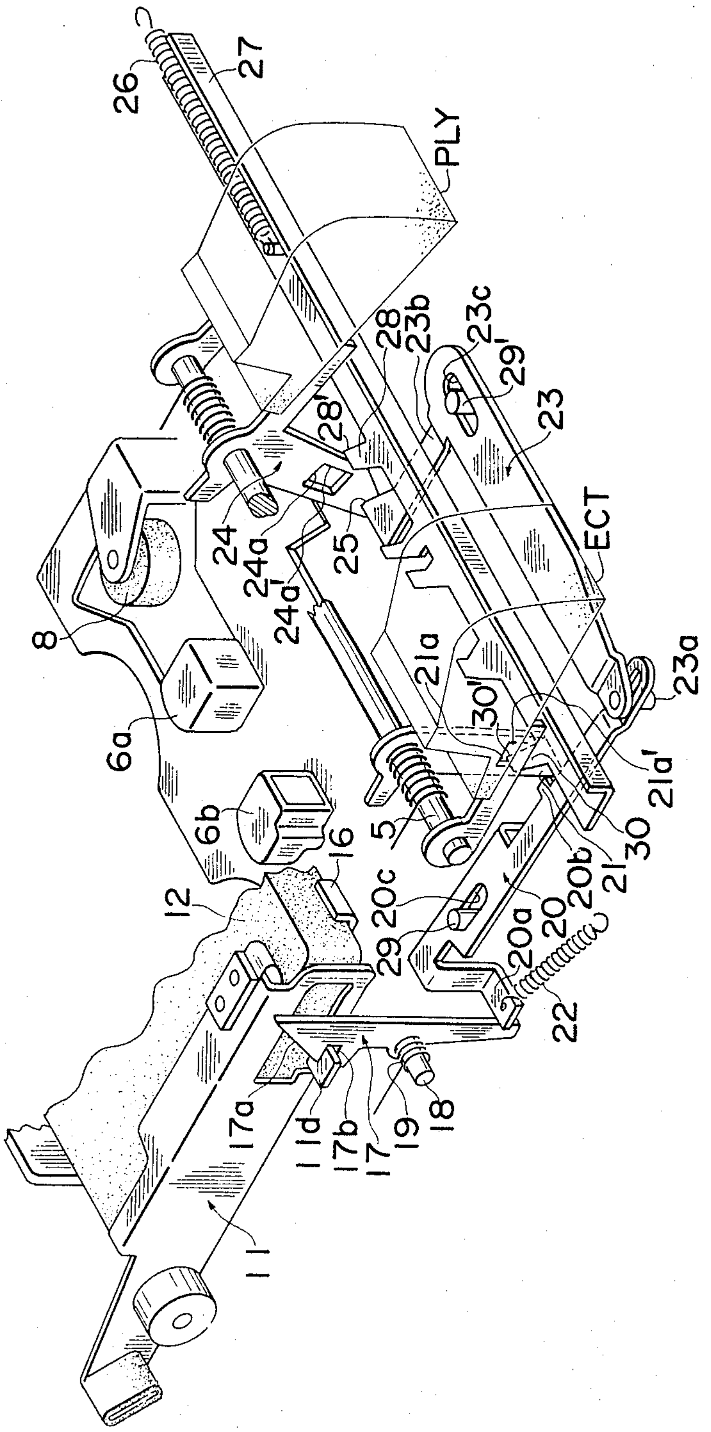
FIG. 2B is a view similar to FIG. 2A but showing the receptacle member locked in the second position thereof.

As is best shown in FIGS. 2A and B, an actuator member 20 is slidably mounted between the lock member 17 and the eject key ECT. The actuator member 20 has one end portion 20*a* engageable with the lower end portion of the lock member 17 and a projection 20*b* engageable with the leg 21 of the eject key ECT. A spring 22 is secured at one end to an unshown fitting on the side wall of the chassis 1 and at the other end to said one end portion 20*a* of the actuator member 20 so that the actuator member is biased away from the lock member 17 by that spring. The actuator member 20 is formed with a slot 20*c* in which a projection 29 downwardly extending from the underside of the chassis 1 is loosely received. The actuator member 20 also has a slot 20*d* formed in the other end portion thereof, which slot receives therein a pin 23*a* provided at one end of a connector member 23.

The connector member 23 has an engaging member 23*b* integrally formed in the other end portion thereof and extending substantially perpendicularly therefrom to confront the leg 24 of the play-back key PLY. The end face of the engaging member 23*b* is sloped as indicated at 25. In said other end of the connector member there is formed a slot 23*c* in which a pin 29' provided on the chassis is received.

In the position as shown in FIG. 2A, the retaining pawl 28 of a lock lever 27 biased rightwardly by a spring 26, as viewed in the figure, is received in an opening 24*a* formed in the leg 24 of the play-back key PLY. When the key PLY is depressed, the rear edge 24*a'* of the opening 24*a* in the leg 24 engages the sloped edge 28' of the retaining pawl 28. Further depression of the key PLY moves the lock lever 27 leftwardly against the force of the spring 26, as viewed in the figure, with a result that the retaining pawl 28 is disengaged from the opening 24*a* while the lock lever 27 is returned to its original position by the spring 26, whereby the play-back key PLY is locked in depressed position with the rear edge of the leg 24 thereof engaged by the end of the retaining pawl 28. Simultaneously therewith, the fore edge of the leg 24 of the key PLY is engaged with the sloped end portion 25 of the engaging member 23*b* of the connector rod 23. Thus, in the fully depressed position of the play-back key PLY, the sloped end portion 25 is bearing against the corresponding side surface of the leg 24 of the key PLY. As a result, the connector rod 23 slides leftwardly from the position of FIG. 2A, thereby rotating the actuator member 20 clockwisely against the force of the spring 22, as viewed in the figure. In this position, therefore, depression of the eject key ECT does not affect the actuator member 20 because the projection 20*b* of the actuator member is not lying in the path of movement of the leg 21 of the key ECT, and thus the actuator member remains stationary. In this case, however, the rear edge 21*a'* of the opening 21*a* in the leg 21 of the eject key ECT is in engagement with the sloped edge 30' of the pawl 30 of the lock lever 27, whereby the lock lever 27 is leftwardly slidden against the force of the spring 26 as viewed in the figure. As a result, the play-back key PLY is released from the described locked condition imparted by the lock lever 27, and this it is instantaneously returned to normal or undepressed position. Simultaneously therewith, the connector rod 23 is brought to the position of FIG. 2A, whereby the projection 20*b* of the actuator member 20 is now positioned in the path of movement of the leg 21 of the eject key ECT.

When the eject key is again depressed, the fore edge of the leg 21 thereof engages the projection 20*b* of the actuator member 20 to slidably move the member 20 against the spring 22 to the phantom line position in FIG. 2A, with a result that the end portion 20*a* of the actuator member 20 urges the lower end portion of the lock member 27 to pivotally move it as indicated by phantom lines in FIG. 2A. Thus, the receptacle member 11 is unlocked and then resiliently pivoted to the position as indicated by phantom lines in the figure, whereupon the cassette 13 is resiliently pushed outwardly by the push-out member 13 (FIG. 1A) of the receptacle member.

It will thus be apparent that the present invention enables the tape recorder device to be brought to mechanically stopped condition upon depression of the eject key alone and also enables the cassette to discharge in such condition. Accordingly, whenever the operator wants to remove the cassette during either operation or non-operation of the tape recorder, he can achieve such purpose simply by depressing the eject key alone, which means complete avoidance of any erroneous operation and simplification of the required operation.

While the invention has been described with a specific embodiment thereof, it is to be understood that the invention is not restricted thereto but it covers all the modifications and alterations which may fall within the spirit and scope of the invention as defined in the appended claims.

What is claimed is:

1. In a magnetic recording reproducing device comprising a pair of reel spindles for removably mounting thereon a magnetic tape cassette, drive means for rotating said spindles, magnetic head means for engaging a magnetic tape in said cassette, and a plurality of depressibly operated keys, including a playback key and an eject key, which are arranged in a row along one side of said device, the improvement comprising a cassette eject mechanism for disengaging said magnetic head means from said tape and simultaneously stopping said tape at one full depression of said eject key and for discharging said cassette from said device at a second full depression of said eject key, said one full depression and said second full depression being depressibly identical.

2. The improvement of claim 1 wherein said eject mechanism comprises, in combination:

A. a playback leg which is perpendicularly disposed to said row and is pivotably operated by said playback key in a pivoting direction, comprising: a side surface and, with respect to said pivoting direction, a fore edge, a rear edge, and a window having a rear window edge, said playback leg being resiliently movable in parallel to said row and said pivoting direction being perpendicular to said row;

B. an eject which is perpendicularly disposed to said row and is pivotably operated by said eject key in said pivoting direction, comprising: a side, a surface, and with respect to said pivoting direction, a fore edge, a rear edge, and a window having a rear window edge, said eject key being resiliently movable in parallel to said row; and C. an elongated lock lever, disposed in parallel to said row and extending at least from said playback key to said eject key, which is adapted for longitudinal sliding in an engagement direction and in a disengagement direction, comprising:

1. a retaining pawl, projecting in said pivoting direction from one elongated side of said lock lever, and having a sloped edge, which is adapted to engage said rear window edge in said playback key, and an end, which is adapted to engage said rear edge of said playback leg,
2. an eject pawl, projecting in said pivoting direction from said one elongated side of said lock lever, and having a sloped edge which is adapted to engage said rear window edge of said eject leg, and
3. a resilient biasing means which tends to move said lock lever in said engagement direction.

3. The improvement of claim 2, wherein said eject mechanism further comprises:

A. a connector rod, which is disposed in parallel to said row, and an engaging member, which is perpendicularly and rigidly attached to said connector rod, extends therefrom in said pivoting direction, and has a sloped end portion which is adapted to engage said fore edge of said playback leg and to rest against said side surface of said playback leg when said play-back leg is fully depressed, said connector rod being pivotable perpendicularly to said pivoting direction, B. an elongated actuator member which is pivotably connected at one end to one end of said connector rod and is generally disposed perpendicularly thereto and extends in said pivoting direction, and comprises:

1. a projection extending in said engagement direction and adapted to engage said fore edge of said eject key, and
2. an end portion extending sidewardly therefrom.

4. The improvement of claim 3 wherein said eject mechanism further comprises a lock member which is pivotably and resiliently mounted, having a lower end portion engaged by said end portion of said actuator member and an upper end portion comprising a sloped edge and a locking cut-away which is adapted to hold a receptacle for said cassette.

5. The improvement of claim 4 wherein said actuator member is pivotably mounted and biased to move said connector rod in said engagement direction, thereby enabling said eject key to be fully depressed for both stopping said tape and ejecting said cassette, as follows:

A. when said playback key is depressed causing said playback leg to be pivoted, slideable contact of said rear window edge thereof slides said lock lever in said disengagement direction and locks said rear edge of said playback leg against said end of said retaining pawl, B. slideable contact of said fore edge thereof with said sloped edge of said retaining pawl moves said connector rod slideably and pivotably to remove said projection on said actuator member away from said eject leg, thereby enabling said eject leg to be fully pivoted, and C. when said eject key is depressed and said playback leg is pivoted, slideable contact of said rear window edge thereof with said sloped edge of said eject pawl further slides said lock lever in said disengagement direction and releases said playback leg, whereby said engaging member, said connector rod, and said actuator member move slideably and pivotably in said engagement direction and said projection is in the path of pivotable movement of said eject leg.

* * * * *